United States Patent
Klug et al.

(10) Patent No.: US 10,333,732 B2
(45) Date of Patent: Jun. 25, 2019

(54) ARRANGEMENT AND METHOD FOR CONTROLLING ELECTRONICALLY CONTROLLABLE DEVICES AND SYSTEMS IN PUBLIC AND PRIVATE BUILDINGS

(71) Applicant: iHaus AG, Unterfoehring (DE)

(72) Inventors: Robert Klug, Munich (DE); Dieter Meiller, Kastl (DE); Hans Martin Roth, Munich (DE)

(73) Assignee: iHaus AG, Unterfoehring (DE)

( * ) Notice: Subject to any disclaimer, the term of this patent is extended or adjusted under 35 U.S.C. 154(b) by 424 days.

(21) Appl. No.: 14/972,833

(22) Filed: Dec. 17, 2015

(65) Prior Publication Data
US 2016/0191263 A1 Jun. 30, 2016

Related U.S. Application Data

(63) Continuation of application No. PCT/EP2014/001682, filed on Jun. 20, 2014.

(30) Foreign Application Priority Data

Jun. 27, 2013 (DE) .................. 10 2013 010 711
Jun. 27, 2013 (DE) .................. 20 2013 005 790 U

(51) Int. Cl.
*G05B 15/02* (2006.01)
*H04L 12/28* (2006.01)

(52) U.S. Cl.
CPC ............ *H04L 12/283* (2013.01); *G05B 15/02* (2013.01); *H04L 12/282* (2013.01); *G05B 2219/25011* (2013.01); *G05B 2219/2642* (2013.01)

(58) Field of Classification Search
CPC .. G05B 2219/25011; G05B 2219/2642; H04L 12/282; H04L 12/2821; H04L 12/283
See application file for complete search history.

(56) References Cited

U.S. PATENT DOCUMENTS

| 652,236 | A | 6/1900 | Fletcher |
| 5,877,957 | A | 3/1999 | Bennett |
| 6,522,346 | B1 * | 2/2003 | Meyer ................ G05B 19/0426 700/17 |
| 2002/0035404 | A1 | 3/2002 | Ficco et al. |
| 2005/0097618 | A1 | 5/2005 | Arling et al. |
| 2008/0309513 | A1 * | 12/2008 | Ebbe ..................... G08C 17/02 340/4.21 |
| 2013/0103621 | A1 | 4/2013 | Matsuoka et al. |

FOREIGN PATENT DOCUMENTS

DE 202012006898 A1 10/2012

* cited by examiner

*Primary Examiner* — Raj R Gupta
(74) *Attorney, Agent, or Firm* — Von Rohrscheidt Patents

(57) ABSTRACT

The invention relates to an arrangement for controlling electronically controllable devices and systems in public and private buildings and a method for controlling electronically controlling devices and systems in public and private buildings. Thus, the arrangements and methods for building automation are improved so that a user can generate combined control routines which comply with his wishes without prior knowledge of the effect of the individual control commands. Furthermore, the control routines are proposed to the user upon request by the user.

9 Claims, 6 Drawing Sheets

| Edit iHouse-Actions | |
|---|---|
| 51 — iHouse-Action 1 (TV: On, Radio: Off, Lamp 1: 30%, Lamp 2: Off, Shutter 100%) | Execute |
| 55 — iHouse-Action 2 (TV: Off, Radio: On, Lamp 1: Off, Lamp 2 : On) | Execute |
| 61 — iHouse-Action 3 (All lights off in Living Room) | Execute |
| 63 — iHouse-Action ... (...) | Execute |
| 65 — iHouse-Action n (Kitchen Lamp On, Expresso machine On) | Execute |

FIG. 4

ARRANGEMENT AND METHOD FOR CONTROLLING ELECTRONICALLY CONTROLLABLE DEVICES AND SYSTEMS IN PUBLIC AND PRIVATE BUILDINGS

RELATED APPLICATIONS

This application is a continuation of International Patent Application PCT/EP2014/001682 filed on Jun. 20, 2014 claiming priority from German Patent Application 10 2013 010 711.3 filed on Jun. 27, 2013 and German patent application 20 2013 005 790.4 filed on Jun. 27, 2013, all of which are incorporated in their entirety by this reference.

FIELD OF THE INVENTION

The instant invention relates to an arrangement for controlling electronically controllable devices and system in public buildings according to the preamble of claim 1.

BACKGROUND OF THE INVENTION

Arrangement and methods of this general type for building automation are known in the art. Thus, known systems facilitate controlling individual devices with respective control commands.

Furthermore there is also the option to configure combined actions which can be controlled jointly with the control routines, as known from the system Thoma made by the Somfy company. Thus, decentralized building servers with associated computer equipment are required in the respective building. The user then predetermines the desired control commands for the system and combines the control commands under a callable control routine. Thus, the user however has to consider in advance which control commands he actually wishes to perform in an intended combined control routine. This, however, is possible for most users only with great complication and not in a comfortable manner.

BRIEF SUMMARY OF THE INVENTION

Thus, it is an object of the invention to improve arrangements and methods for building automation so that the user can generate combined control routines which satisfy his needs without prior knowledge of the effect of the individual control routines. In particular building automation shall be provided which suggests control routines to the user upon request.

This object is achieved by an arrangement for controlling electronically controllable devices or systems in public and private buildings, the arrangement including at least one device or system and a control device associated with a building, the control device configured to issue control commands for controlling a function of the at least one device or the system, wherein the at least one device or the system is configured to selectively change its condition as a function of the control commands from the control device, wherein recording devices for recording the control commands from the control device and association devices are provided which enable a user of the arrangement to associate one or plural recorded control commands with a selectable control routine, wherein identification devices for identifying interrelated control commands are provided which propose to the user to associate the interrelated control commands with the control routine, and wherein the identification devices are configured to identify control commands as interrelated which are issued within a predetermined time period which are issued for devices or systems of a particular space.

The object is also achieved by a method for controlling electronically controllable devices and systems in public and private buildings, wherein at least one device or system associated with the building and control devices for issuing commands for controlling a function of the at least one device or the system are provided, wherein the at least one device or system is configured to selectively change its condition as a function of control commands from the control devices, wherein the control commands from the control device are recorded and a user is enabled to associate one or plural of the recorded control commands with a selectable control routine, wherein interrelated control commands are identified and it is proposed to the user to associate the interrelated control commands with the control routine, wherein the control commands which are issued within a predetermined time period and/or for systems or devices of a particular space are identified as interrelated. Advantageous embodiments are provided in the independent claims.

Surprisingly the inventors have that the object can be achieved in that executed control commands of the user are recorded and in that the user can associate these recorded control commands with a control routine.

Since these are recorded control commands, thus control commands which are actually used for controlling the user can directly detect a success of the control command and can judge whether this command is useable for a sensible control routine.

The device according to the invention for controlling electronically controllable devices and systems in public and private buildings (building automation arrangement), comprising:

a least one device associated with the building and/or the system and control devices for issuing commands for controlling a function of a device and/or system, wherein the device or system is configured for a selective condition change as a function of the control commands of the control devices, The device or system characterized in that devices for recording control commands of the control device are provided and association devices are provided which enable the user to associate one or plural of the recorded control commands with a selectable control routine.

Associated real estate is part of the public and private buildings.

Advantageously display devices are provided for displaying control commands in a selected time period, in particular in an elapsed time period. Thus, a user can combine control commands from a selected time period to form a control routine since the user is only displayed control commands which were relevant for this time period.

In a particularly advantageous embodiment it is provided that the devices configured for recording the control commands only record the control commands triggered by the user. This facilitates a selection of suitable control commands for the user since controls automatically performed by the building automation system, e.g. weather dependent controls are hardly ever suitable for a repeat routine. However, recording such commands can be useful when the user wishes to further improve such automatic controls. For example a temperature dependent reduction control of the heating system can be combined in a controlled manner with turning on an air conditioning system and/or extending awnings.

In another advantageous embodiment devices for identifying interrelated control commands are provided which propose an association of the interrelated control commands with the control routine to the user. Thus, it is not necessary for the user any more to memorize the effect of the control commands, but only such control commands that are interrelated are proposed for a routine.

In an advantageous embodiment the devices for identification can be provided to identify interrelated control commands which are issued within a predetermined time period of advantageously 15 minutes at the most, advantageously 10 minutes at the most, in particular 5 minutes at the most. Thus, the presumption is that the control commands that are issued in a narrow time window are interrelated and are therefore also called up repeatedly.

Alternatively or additionally it can be provided that the identification devices are configured to identify control commands as being interrelated, wherein the control commands are issued for systems or devices of a certain space. Thus, a space is not only a room or similar, but also a clear area like a garden etc.

The control commands can also be control commands which are issued by the user himself, or also control commands that are issued automatically by the building automation system because they were either already programmed by the user in advance or because they were caused by the system itself.

Particularly advantageously the recording devices are configured so that the starting point and/or the end point of the recording is determinable by the user, wherein it is advantageously provided that the association devices are configured to associate all recorded control commands with the control routine. Thus, the user can perform a recording of the control commands issued by him for the devices and systems in order to check the effects and in order to subsequently associate the associated control commands with a control routine.

Advantageously the control devices are configured to execute the control routine automatically at a predetermined point in time and/or directly after activation by the user.

In another advantageous embodiment it is provided that the arrangement is adapted for the user to remove control commands from an existing control routine or associate the control commands with the existing control routine. Thus, control routines can be tested initially and changed thereafter as required.

In a particularly advantageous embodiment it is provided that programs, data and/or routines that are used for controlling the arrangement are provided centrally stored, thus for example not on a decentralized building server but in a cloud. Thus, on the one hand side a knowledgeable technician can perform remote configuration and remote maintenance and on the other hand side the device can be offered to the user in a much more cost effective and space saving configuration since decentralized storing of the program, data and routines, and a redundant provision of storage and control technology leads to excessive additional costs. Advantageously this is a central storage which is used for controlling two or plural building automation systems and/or two or plural user accesses to an individual building automation system, e.g. by a client capable cloud solution.

Independent patent protection is claimed for the method according to the invention for controlling electronically controllable devices and systems in public and private buildings (building automation method), wherein at least one device and/or system and control device associated with the building is provided for issuing commands for controlling the function of the device and/or of the system, wherein the device or system is configured for selectively changing its condition as a function of control commands of the control devices, wherein the method is characterized in that the control commands of the control device are recorded and the user can associate one or plural of the recorded control commands with a selectable control routine.

The described features can be easily combined with each other when nothing else is stated. In particular features of the device can be used as features of the method and features of the method can be used as features of the device.

BRIEF DESCRIPTION OF THE DRAWINGS

The features and characteristics and other advantages of the instant invention are subsequently described in more detail based on advantageous embodiments with reference to drawing figures, wherein:

FIG. 4 illustrates a scheme for editing control routines that can be generated;

DETAILED DESCRIPTION OF THE INVENTION

Figure 1:
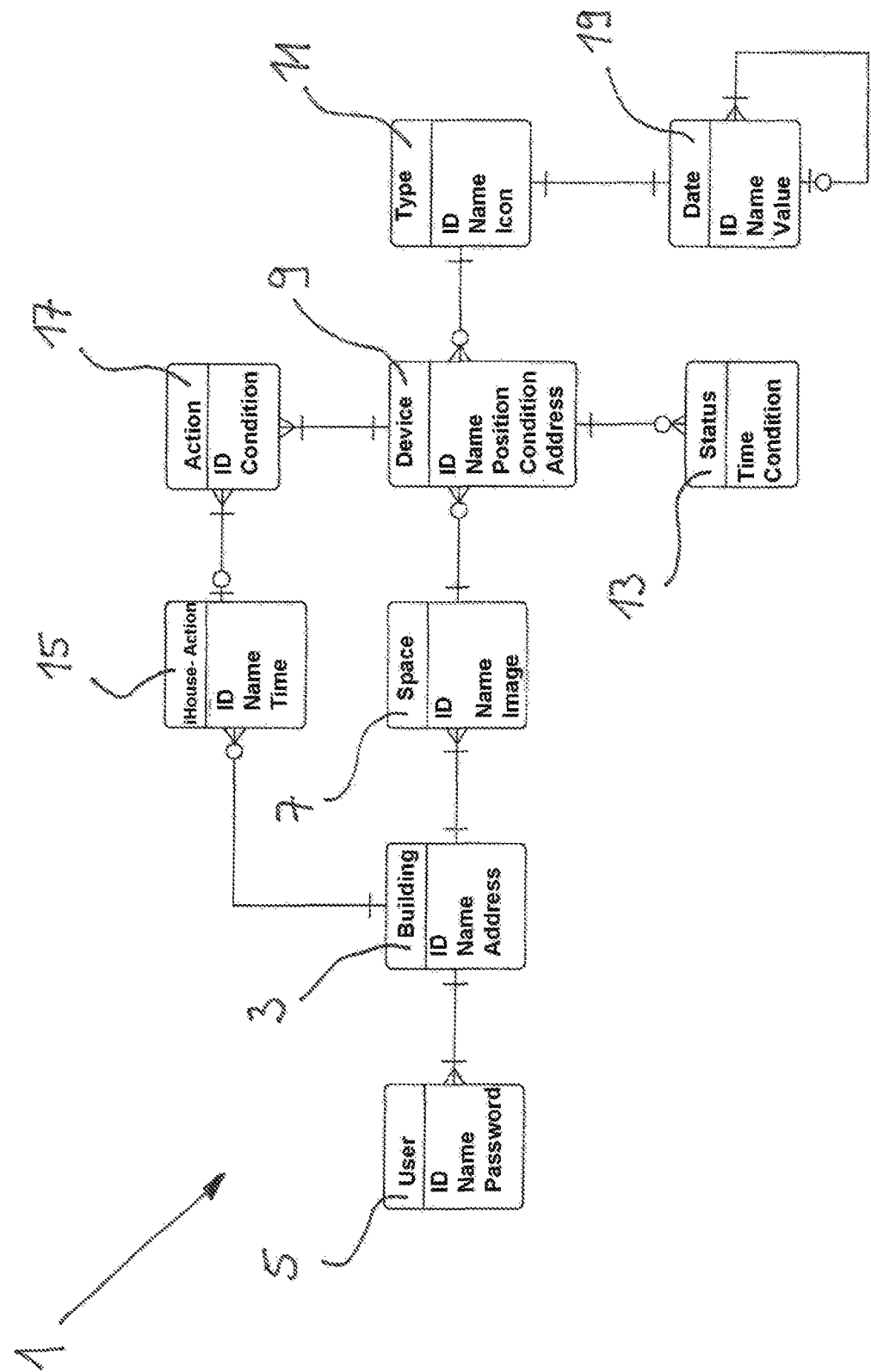
FIG. 1 illustrates a diagram depicting a data base structure of the arrangement according to the invention.

FIG. 1 illustrates a data base scheme and thus a configuration of a cloud data structure of an arrangement 1 according to the invention for controlling electronically controllable devices and systems in public and private buildings, (building automation arrangement) in a schematic manner.

The following relationships can be derived from the figures. Each building 3 can have one or plural users 5. Each building 3 has one or plural spaces 7. By the same token there are plural devices 9 per space 7. Each device 9 has exactly one type 11. Each device 9 has a list of expired conditions 13. Each control routine ("iHouse-actions") 15 can have one or plural control commands ("action") 17 of one or plural devices 9. Each building 3 can then be controlled by a control routine 15 of this type. Thus respective individual identification numbers are associated with the building 3, the user 5, the room 7, the device 9, the type 11, the control routine 15, control command 17 and date 19 ("ID") for given a proprietary name ("name") and an associated date ("date"). Each user 5 can furthermore have a proprietary pass word ("password"). Each building 3 can have a proprietary address ("address"). Each room can be associated with a proprietary image ("image"), each device can be associated with a proprietary position ("position"), a proprietary condition ("condition") and a control technique address ("address") and each type (device type) ("type") can be associated with a proprietary logo ("icon") which is used for control and operation. Each device type ("type") only has one particular data type ("date") as a basis. A data type can be for example only ("on/off") or an interval [0; 1] as it is useful among other things for dimming lamps and shutters since intermediary steps are possible therein. Additional data types are conceivable, thus a television set can have a program quantity as a data type, thus the stored transmitters.

Figure 2:
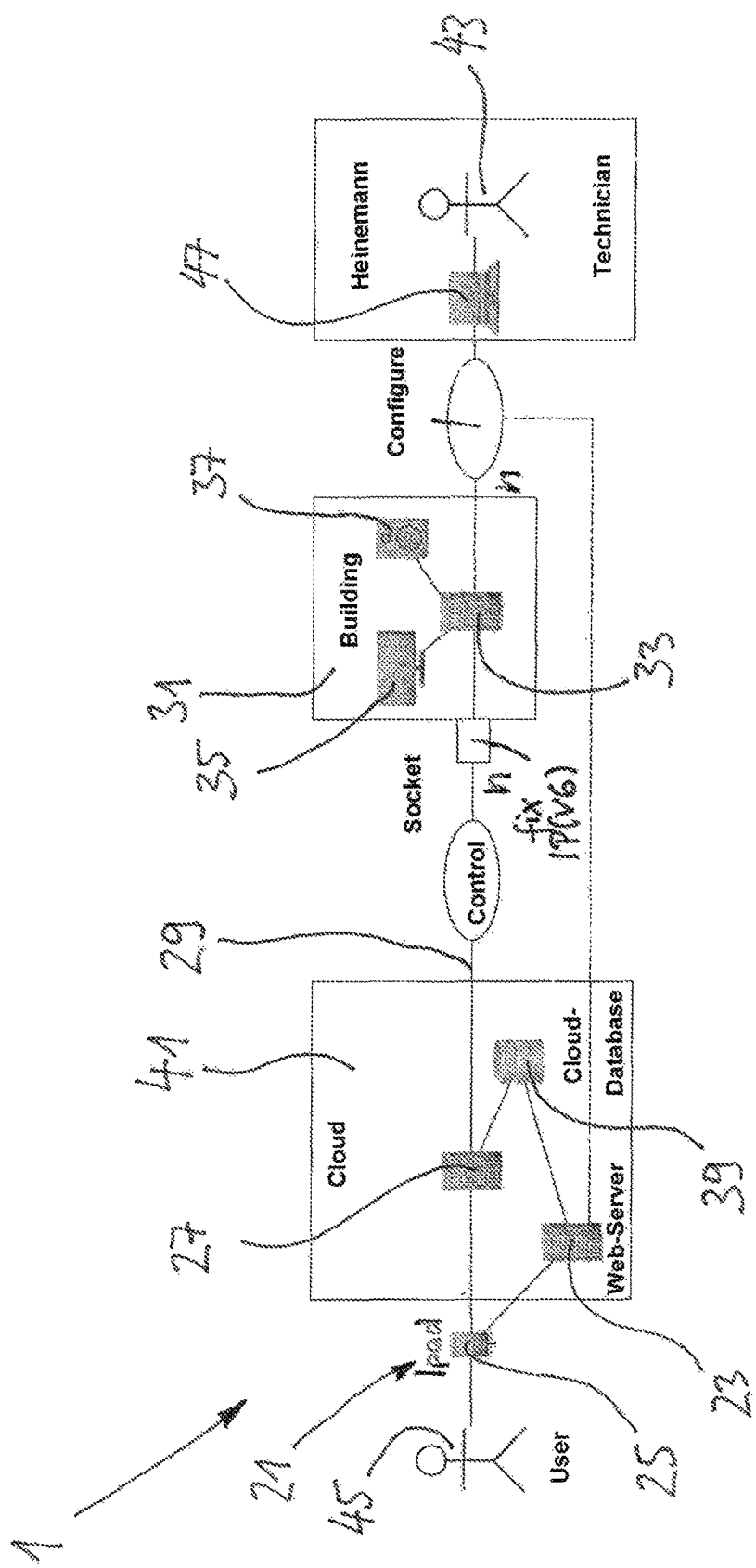
FIG. 2 illustrates a block diagram of the elements of the arrangement according to the invention according to FIG. 1.

FIG. 2 schematically illustrates a block diagram for the elements of the arrangement 1 according to the invention according to FIG. 1. It is evident that a client software 21 is provided which is delivered through the internet by a web server 23 to a tablet 25 or another client. This client 25 communicates with a socket server 27, e.g. a node server which can establish a standing TCP connection 29 or each other suitable type of wire based or wireless connection to devices. e.g. a home server 33 with connected consumer electronics devices configured as a television 35 and a stereo 37 that are arranged in a building 31. This socket server 27 waits for messages e.g. status reports of the devices 33, 35, 37 of the respective building 31 and reports them to the client 25. When the report has been successively performed the client 25 causes a record change in the data base 39 of the cloud 41.

A knowledgeable technician 43 installs the software and configures the software. A configuration by the user 45 is not desirable. A special administrative surface 47 is provided for the technician 43. The technician 43 furthermore configures the building devices 33, 35, 37 through the home server 33 and the data base 39 through the web server 23.

All user interactions and associated control commands are centrally stored in the data base 39 in the cloud 41 so that decentralized storage per building 31 is not required.

The control routines that are used according to the invention (iHouse-actions) are combined control commands (action) of one or plural devices 33, 35, 37 that are issued in a predetermined time period. Thus, advantageously the only the control commands are considered that are issued by the user 45 since this relates to evaluating user habits.

Figure 3A:
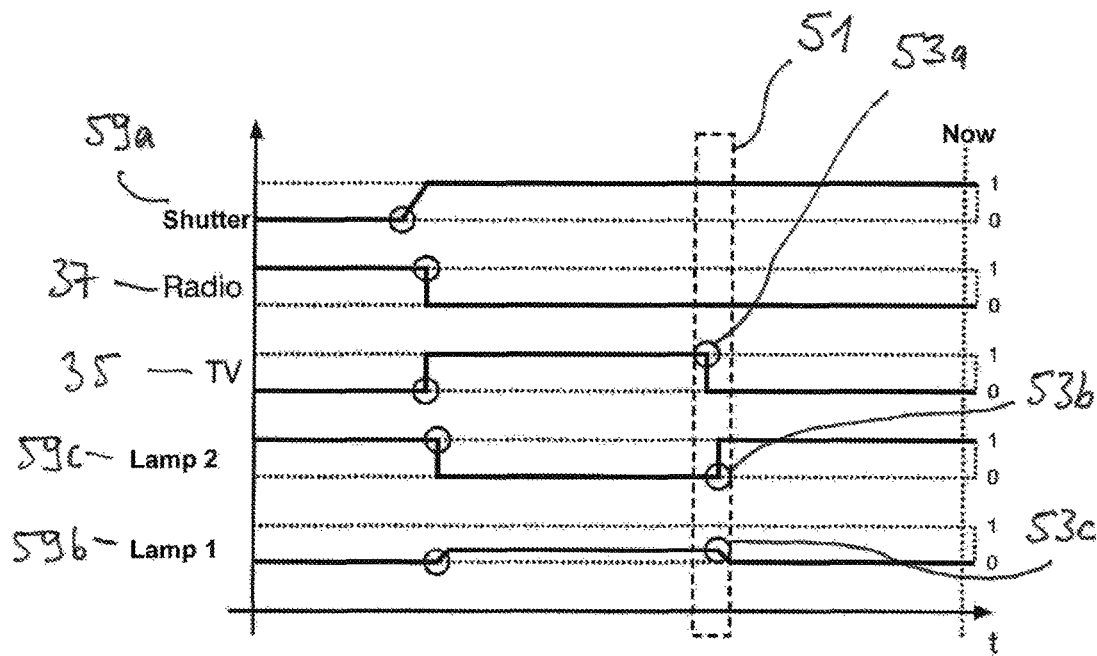
FIG. 3a, 3b illustrates a display of recorded control commands within a time window with an identification of associated control commands.
Figure 3B:
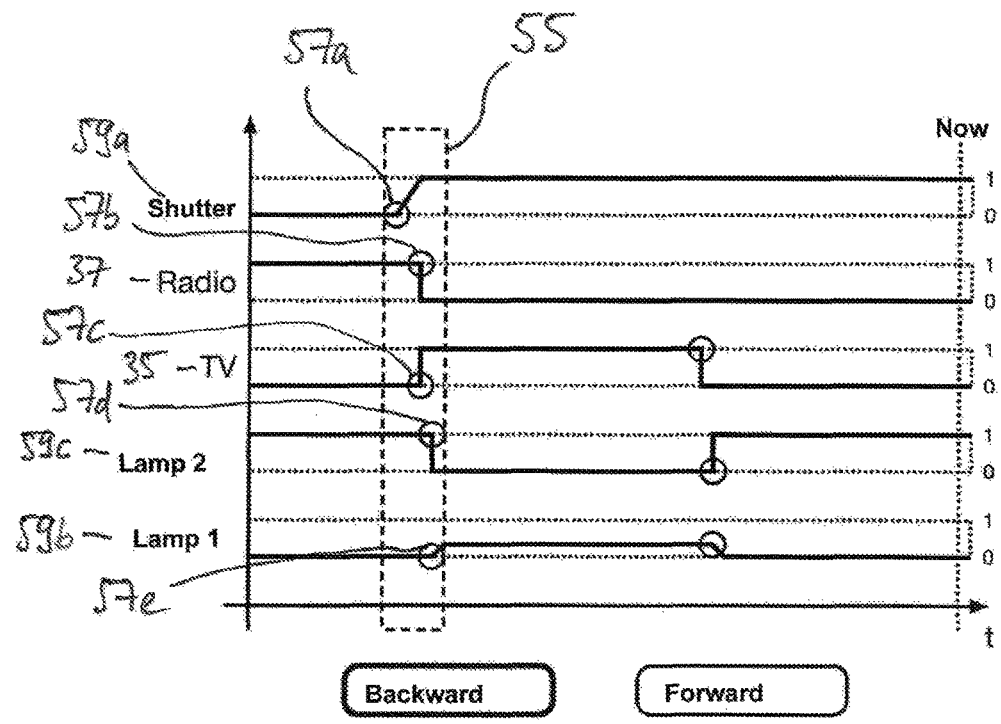

FIGS. 3a, 3b show schematical control commands within a time window with an identification of associated control commands, wherein such user habits are illustrated in conjunction with the control routing "TV-news".

It is evident that in view of watching news on television several most likely interrelated actions have to be performed in a short time period. A shutter of a room in which television is viewed is closed, a radio in this room is turned off, a television set is turned on, a lamp in the room is switched off, another lamp in the room is dimmed (c.f. FIG. 3a). Some of these control commands are executed after the newscast in reverse sequence but not all. The shutter is for example closed (c.f. FIG. 3b).

The device 1 according to the invention records all control commands executed through the user interface of the tablet 25 and advantageously only these control commands. When calling up the time line view (FIG. 6) all control commands performed after the current time are illustrated (cf. FIG. 3a, 3b). The last control commands 53a, 53b, 53c which were performed within a particular time period, e.g. tolerance value of 5 minutes corresponds to the width of the marking 51 of the first control routine 51, are preselected for the combining first control routine 51.

The user 45 now has the option to store the control commands 53a, 53b, 53c as a first control routine 51 under a particular name.

Using the control elements ("forward" and "backward") the user 45 can obtain additional proposals for suitable control routines 55, wherein in turn the next further backward control commands 57a, 57b, 57c, 57d, 57e that are performed in sequence within the tolerance value are marked 55 (c.f. FIG. 3b). Also these control routines 55 can be optionally stored by the user 45.

Thus with respect to the FIGS. 3a and 3b, for example the respective control routines "TV messages end" 51 and "TV messages beginning" 55 can be determined and stored.

Furthermore there is the option to increase or reduce the tolerances, thus the markings 51, 57 by finger wiping so that more or fewer control commands 53a, 53b, 53c, 57a, 57b, 57c, 57d, 57e are associated with a proposal for a control routine 51, 55. Furthermore there is the option to remove the devices 33, 35, 37, 59a, 59b, 59c from the selection or to adapt the associated control parameters with an input.

In case the user determines immediately or later by selecting the control routine 51, 55 that a predetermined control command 57 cannot be sensibly used within the control routine 51, 55 the user 45 can remove this control command 53a, 53b, 53c, 57a, 57b, 57c, 57d, 57e immediately or later from the control routine 51, 55 or adapt it in a suitable manner, for example to dim the light of the other lamp 59b more strongly.

For such a removal or adaptation of respective control commands in a control routine 51, 55, 61, 63, 65 it is provided according to FIG. 4 according to the invention that the entire control routine 51, 55, 61, 63, 65 is executed so that removals and/or additions of individual control commands can be tracked directly with respect to their effects.

Furthermore there is the option to execute a control routine 51, 55, 59, 61, 63 at a particular point in time. Thus, a point in time of a start and of an end of the control routine 51, 55, 59, 61, 63 can be entered and it can also be stated in which interval the control routine 51, 55, 59, 61, 63 shall be executed, for example once, daily, weekly or monthly.

Figure 5:
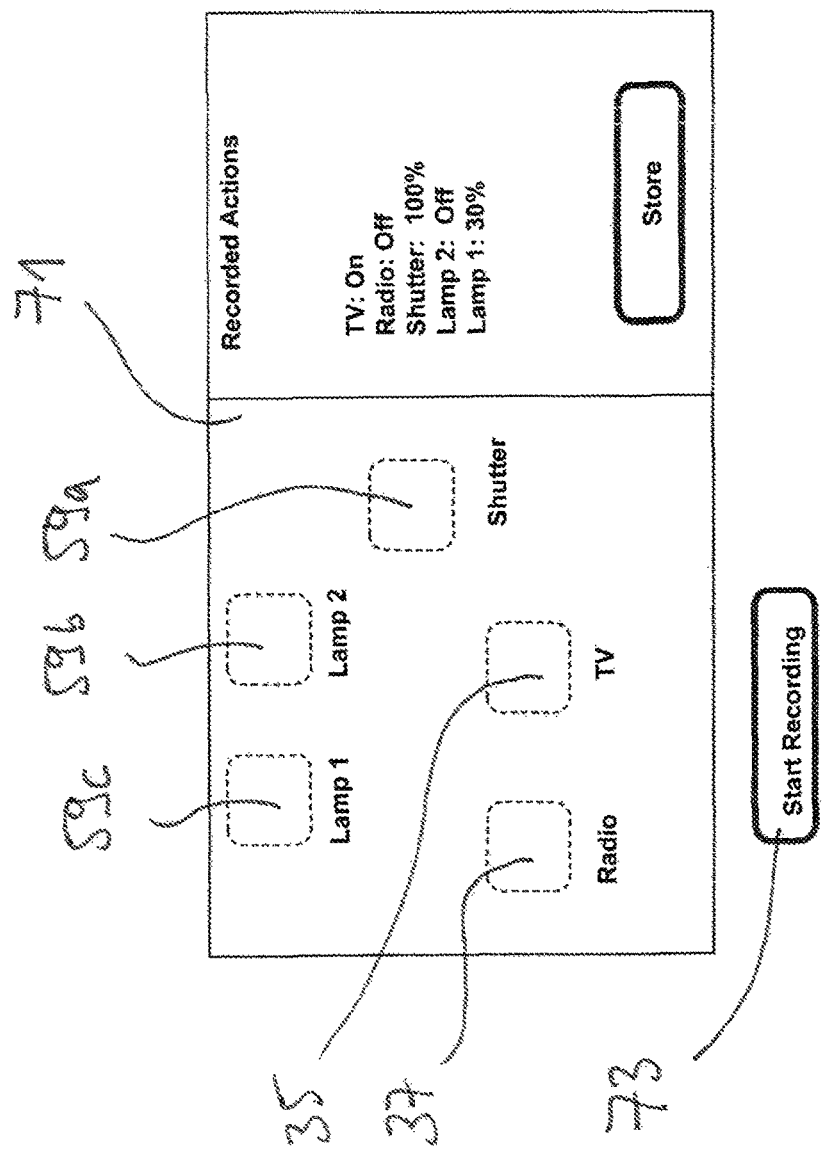
FIG. 5 illustrates a user interface for manually recording issued control commands.
Figure 6:
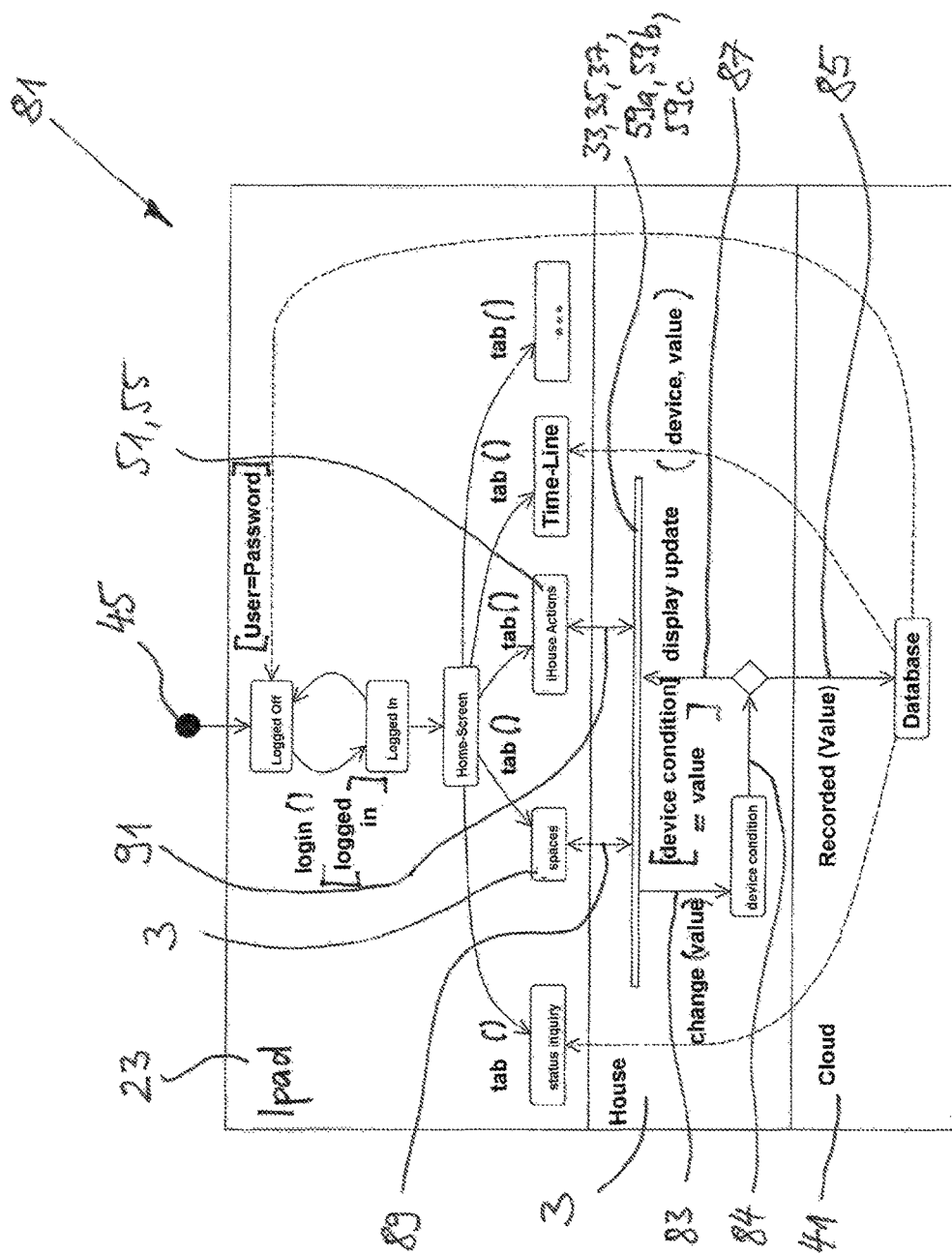
FIG. 6 illustrates a diagram for performing a method according to the invention.

An alternative or additional option to generate control routines is schematically illustrated in FIG. 5, put differently FIG. 5 illustrates a user interface 71 for manually recording issued control commands. It is evident that the user 45 can perform a recording 73 of all control commands issued by himself for the building appliances 35, 37, 59a, 59b, 59c during execution for a particular space (c.f. FIG. 6, "spaces"). The control commands thus executed ("recorded actions") can then be stored as a new control routine ("store") which in turn is also editable (c.f. FIG. 4).

FIG. 6 illustrates a schematic diagram for performing the method 81 according to the invention. It is evident that the user 45 logs in with the arrangement 1 ("login( )") and sees a "home screen" on his tablet 23. Through this home screen the user can enter by tapping ("tab( )") into menus for status inquiry ("status inquiry") without a status change of the individual devices (33, 35, 37, 59a, 59b, 59c) to the individual spaces 3, the provided control routines 51, 55 (iHouse actions) and to permanent recording of control commands ("time line").

At this level of the building 3 device conditions ("device condition") of the devices 33, 35, 37, 59a, 59b, 59c are changed 83 and read out 84 and supplied 85 to a database arranged in the cloud 41 ("database") and optionally simultaneously displayed 87 at the device 33, 35, 37, 59a, 59b, 59c. Through the menus spaces ("spaces") and control routines ("iHouse-actions") influence 89, 91 can be imparted upon the conditions of the devices 33, 35, 37, 59a, 59b, 59c and current conditions can be displayed 89, 91.

From the data base 39 arranged in the cloud 41 information is provided during the status inquiry ("status inquiry"), during the permanent recording of control commands ("timeline") and for checking a password of each user 45.

From the preceding illustration numerous advantages of the instant invention are apparent.

Thus, frequently recurring control commands can be detected by a visual representation and can then be combined in control routines.

Since the control commands are always executed before being supplied to a control routine the user 45 does not require any in depth understanding of the effect or interaction of the various control commands. This also applies to editing already existing control commands.

By combining the control commands into an abstract higher control routine procedures in the building can be simplified since they can be triggered by a single command. This means more comfort and time savings than separate execution of the control commands.

Additionally the user gets a better overview of the control commands executed in the building 3. This leads to a more efficient use of building automation and thus also to energy savings.

Since the control commands are explicitly triggered by the user 45 and not automatically triggered in advance by the building automation system the user 45 has the feeling of complete control.

REFERENCE NUMERALS AND DESIGNATIONS

1 control arrangement according to the invention
3 building
5 user
7 spaces
9 device
11 device type
13 list of past conditions
15 control routine
17 control command
19 date
21 client software
23 web server
25 tablet
27 socket server
29 TCP connection
31 building
33 home server
35 television set
37 stereo system
39 database
41 cloud
43 technician
45 user
47 administration surface
51 first control routine, marking
53a, 53b, 53c control commands
55 control routine
57a, 57b, 57c, 57d, 57e control commands
59a, 59b, 59c devices
61, 63, 65 control routines
71 user interface
73 recording
81 control method according to the invention
83 change of device conditions
84 read out of device conditions
85 supply of device conditions to the data base
87 display of device conditions
89, 91 influencing and displaying device conditions

What is claimed is:

1. An arrangement for controlling electronically controllable devices or systems in public and private buildings, the arrangement comprising:
   at least one device or system and a control device associated with a building, the control device configured to issue control commands based on an input by a user and executed by controlling a function of the at least one device or the system,
   wherein the at least one device or the system is configured to selectively change its condition as a function of the control commands issued by the control device,
   wherein recording devices for recording control commands issued by the control device and executed by the at least one device or system and association devices are provided which enable the user of the arrangement to associate one or plural issued, executed and recorded control commands with a selectable control routine,
   wherein identificaton devices for identifying interrelated control commands are provided which propose to the user to associate the interrelated control commands with the control routine,
   wherein the identification devices are configured to identify control commands as interrelated which are issued within a predetermined time period or which are issued for devices or systems of a particular space, and
   wherein the control device is a computer, a web server, a tablet, a socket server or a cloud.

2. The arrangement according to claim 1, wherein display devices are provided for displaying the control commands in a selected and elapsed time period.

3. The arrangement according to claim 2, wherein the time period is 15 minutes at the most.

4. The arrangement according to claim 1, wherein the recording devices for recording the control commands are configured to record only control commands initiated by the user.

5. The arrangement according to claim 1,
   wherein the recording devices are configured so that a starting point or an end point of a recording is determinable by the user,
   wherein it is provided that the association devices are configured to associate all recorded control commands with the control routine.

6. The arrangement according to claim 1, wherein the control devices are configured to automatically execute the control routine at a predetermined point in time or directly after activation by the user.

7. The arrangement according to claim 1, wherein the arrangement is configured to enable the user to remove control commands from an existing control routine or to associate control commands with the existing control routine.

8. A method for controlling electronically controllable devices and systems in public and private buildings,
   wherein at least one device or system associated wiith the building and control devices for issuing control command for controlling a function of the at least one device or the system are provided,
   wherein the at least one device or system is configured to selectively change its condition as a function of the control command from the control devices,
   wherein the control command from the control devices are recorded and a user is enabled to associate one or plural of the recorded control commands with a selectable control routine,
   wherein interrelated control commands are identified and it is proposed to the user to associate the interrelated control commands with the control routine,
   wherein the control commands which are issued within a predetermined time period or for system or devices of a particular space are identified as interrelated, and wherein the arrangement according to claim 1 is being used.

9. A method, comprising the step:

controlling electronically controllable devices and systems in public and private buildings, wherein at least one device or system associated with the building and control devices for issuing control commands based on an input a user and executed by controlling a function of the at least one device or the system are provided, wherein the at least one device or system is configured to selectively change its condition as a function of the control commands issued by the control devices, wherein the control commands issued by the control devices are executed by the at least one device or system and recorded and a user is enabled to associate one or plural of the issued and recorded control commands with a selectable control routine, wherein interrelated control commands are identified and it is proposed to the user to associate the interrelated control commands with the control routine, wherein the control commands which are issued within a predetermined time period or for systems or devices of a particular space are identified as interrelated, and wherein the control device is a computer, a web server, a tablet, a socket server or a cloud.

\* \* \* \* \*